US008484760B2

(12) United States Patent
Despont et al.

(10) Patent No.: US 8,484,760 B2
(45) Date of Patent: Jul. 9, 2013

(54) DEVICE COMPRISING A CANTILEVER AND SCANNING SYSTEM

(75) Inventors: Michael Despont, Zurich (CH);
Venkataraman Kartik, Zurich (CH);
Charalampos Pozidis, Zurich (CH);
Deepak Ranjan Sahoo, Zurich (CH)

(73) Assignee: International Business Machines Corporation, Armonk, NY (US)

( * ) Notice: Subject to any disclaimer, the term of this patent is extended or adjusted under 35 U.S.C. 154(b) by 263 days.

(21) Appl. No.: 12/952,346

(22) Filed: Nov. 23, 2010

(65) Prior Publication Data
US 2011/0126329 A1 May 26, 2011

(30) Foreign Application Priority Data
Nov. 24, 2009 (EP) .................................. 09176952

(51) Int. Cl.
*G03F 7/02* (2006.01)
(52) U.S. Cl.
USPC ............................... 850/52; 250/306; 73/105
(58) Field of Classification Search
USPC ........................................................ 850/52
See application file for complete search history.

(56) References Cited

U.S. PATENT DOCUMENTS

| 5,606,447 A | * | 2/1997 | Asada et al. | ............... 359/199.1 |
| 5,856,617 A | | 1/1999 | Gurney et al. | |
| 6,611,140 B1 | * | 8/2003 | Bloechl et al. | ........... 324/207.21 |
| 2006/0123895 A1 | * | 6/2006 | Lee et al. | ......................... 73/105 |
| 2007/0062265 A1 | * | 3/2007 | Beyder et al. | ................... 73/105 |
| 2008/0149832 A1 | * | 6/2008 | Zorn | ............................. 250/311 |
| 2008/0257022 A1 | * | 10/2008 | Sachs | ............................. 73/105 |

FOREIGN PATENT DOCUMENTS

| WO | WO 96/28706 A1 | 9/1996 |
| WO | WO 01/73791 A1 | 10/2001 |

* cited by examiner

*Primary Examiner* — Phillip A Johnston
(74) *Attorney, Agent, or Firm* — Tutunjian & Bitetto, P.C.; Eustus D. Nelson

(57) ABSTRACT

A device including a first part and a second part, one of which is a cantilever, the first and second parts being connected to each other and movable relative to each other. The device includes a magnetic element arranged on the first part and configured to provide a magnetic field. The device further includes a magnetization device arranged on the second part and configured to provide an actuation magnetic field which interacts with the magnetic field of the magnetic element, thereby causing or suppressing relative movement of the first and second parts. A scanning system including such a device is also described.

14 Claims, 10 Drawing Sheets

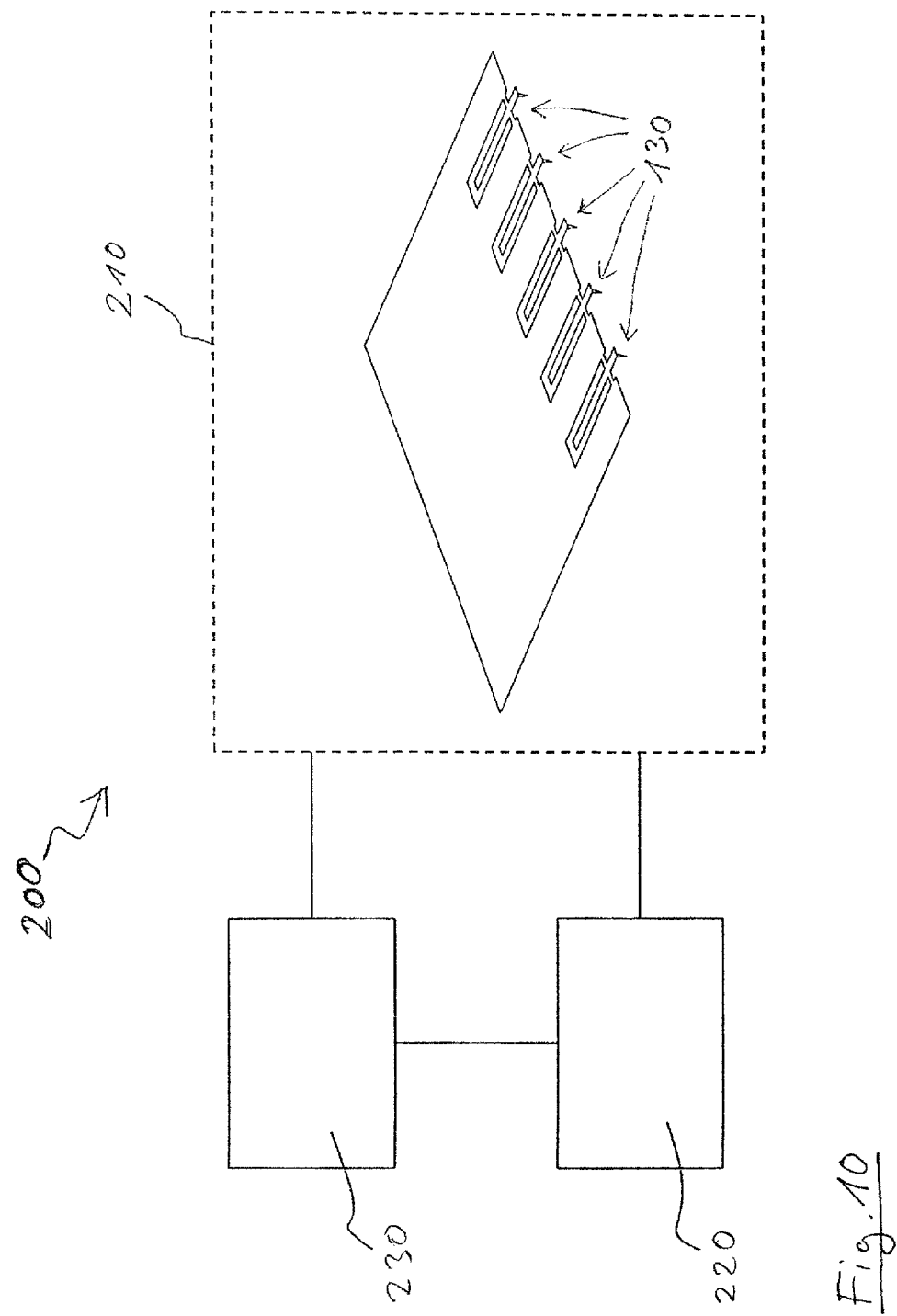

DEVICE COMPRISING A CANTILEVER AND SCANNING SYSTEM

CROSS REFERENCE TO RELATED APPLICATION

This application claims priority under 35 U.S.C. 119 from European Patent Application 09176952.1, filed Nov. 24, 2009, the entire contents of which are incorporated herein by reference.

BACKGROUND OF THE INVENTION

1. Field of the Invention

The present invention relates to a device including two parts, one of which is a cantilever, connected to each other and movable relative to each other. More particularly, the present invention relates to a scanning system including such a device.

2. Description of Related Art

Probe-based scanning systems, also referred to as scanning probe microscopes (SPM), are used for surface analysis of samples with high resolution. SPM systems are particularly used in nanotechnology-related applications including biosensors, data storage, metrology, lithography and nano-fabrication. The measurement principle of these systems is based on monitoring the interaction between a cantilever and a sample. The cantilever may be provided with or without a probe tip, wherein the latter is used, for example, in bio-sensing applications. The cantilever is scanned over the surface to be analyzed, and the displacement or motion of the cantilever is detected in order to provide an image of the surface. Depending on the type of SPM system, a surface analysis may be carried out in different modes, including static and dynamic modes. In a dynamic mode, the cantilever is actuated to vibrate or oscillate, e.g. at or near the resonant frequency of the cantilever.

In many applications including data storage, metrology, lithography and nano-fabrication, high-throughput systems are essential for commercial success. In order to meet this demand, systems incorporating parallelism are provided which employ a large number of micro cantilevers being arranged in an array. In these systems, actuating and sensing capabilities need to be integrated with respect to individual cantilevers for selectivity.

Typically, optical detection systems are used for sensing the deflection of micro cantilevers, because of their high resolution, bandwidth and independence from an actuation mechanism. However, such setups are expensive and bulky, and therefore may be not suitable for selectively detecting the deflection of cantilevers of a large cantilever array. Other sensing concepts which are based on e.g. thermoelectric, piezoresistive, piezoelectric, capacitive and optical waveguide based techniques may provide other solutions, as they may be fabricated in integrated form. Capacitive sensing may require large comb structures and highly sensitive electronics, and may be affected by a high leakage current. Cantilevers using optical waveguides may not be densely fabricated in two-dimensional arrays, and may furthermore be difficult to be integrated with respect to an actuation system at the cantilever level.

Concerning the individual actuation of micro cantilevers being arranged in an array, it is known to apply electrostatic techniques. However, these techniques are constrained to having a conductive substrate below the sample with the sample being very thin. Alternatively, cantilevers may be actuated by means of piezo elements being fabricated on each of them. Moreover, the application of piezo materials may not be suitable for integration on micro cantilevers which are (additionally) configured for a special-purpose characterization (e.g. electrical, magnetic, thermal etc. characterization). Furthermore, cantilevers having a piezoelectric coating for actuation (which may come along with a strain based sensor) have a high stiffness, and may therefore not be suitable for scanning soft samples.

Apart from the above-described deflection sensing and actuation mechanisms, other concepts which make use of magnetism are applied. As an example, U.S. Pat. No. 6,611,140 B1 discloses a scanning probe microscope including a magnetic element and a magnetic sensor in order to sense the displacement of a cantilever. With respect to actuation, WO 96/28706 A1 describes a scanning probe microscope including a cantilever having a magnetic material applied to the same. The microscope furthermore includes a separate solenoid which is used to generate a magnetic field, thereby causing a deflection of the cantilever. A converse actuation concept is described in WO 01/73791 A1. Here, the scanning probe microscope includes a cantilever having two legs, and a separate magnet. By passing an electric current through the legs of the cantilever, a magnetic field is generated which causes a movement of the cantilever.

The application of separate (external) solenoids or magnets may involve the generation of magnetic fields having an influence in a wide area or space, respectively. The known concepts may not be suitable for the integration of a large number of cantilevers. The influence of a wide-area magnetic field may also be present in the area of a sample and of a probe tip, which may restrict the mode of operation to a topographic characterization only. Also, a wide-area magnetic field when used on probes in an array having magneto-resistive elements for self sensing may lead to a reduced and non-uniform sensitivity among the probes.

SUMMARY OF THE INVENTION

According to an embodiment of the present invention, a device includes a first part and a second part, one of which is a cantilever, the first and second parts being connected to each other and being movable relative to each other. The device includes a magnetic element arranged on the first part and configured to provide a magnetic field. The device further includes a magnetization device arranged on the second part and configured to provide an actuation magnetic field which interacts with the magnetic field of the magnetic element, thereby causing or suppressing a relative movement of the first and second part.

BRIEF DESCRIPTION OF THE DRAWINGS

Preferred embodiments of the present invention are described in detail below, by way of example only, with reference to the following schematic drawings.

The drawings are provided for illustrative purpose and are not necessarily drawn to scale. In the figures, same reference signs are used to denote the same or like parts.

FIG. 10 shows a schematic view of a scanning system including a probe device.

DETAILED DESCRIPTION OF PREFERRED EMBODIMENTS

Figure 1:
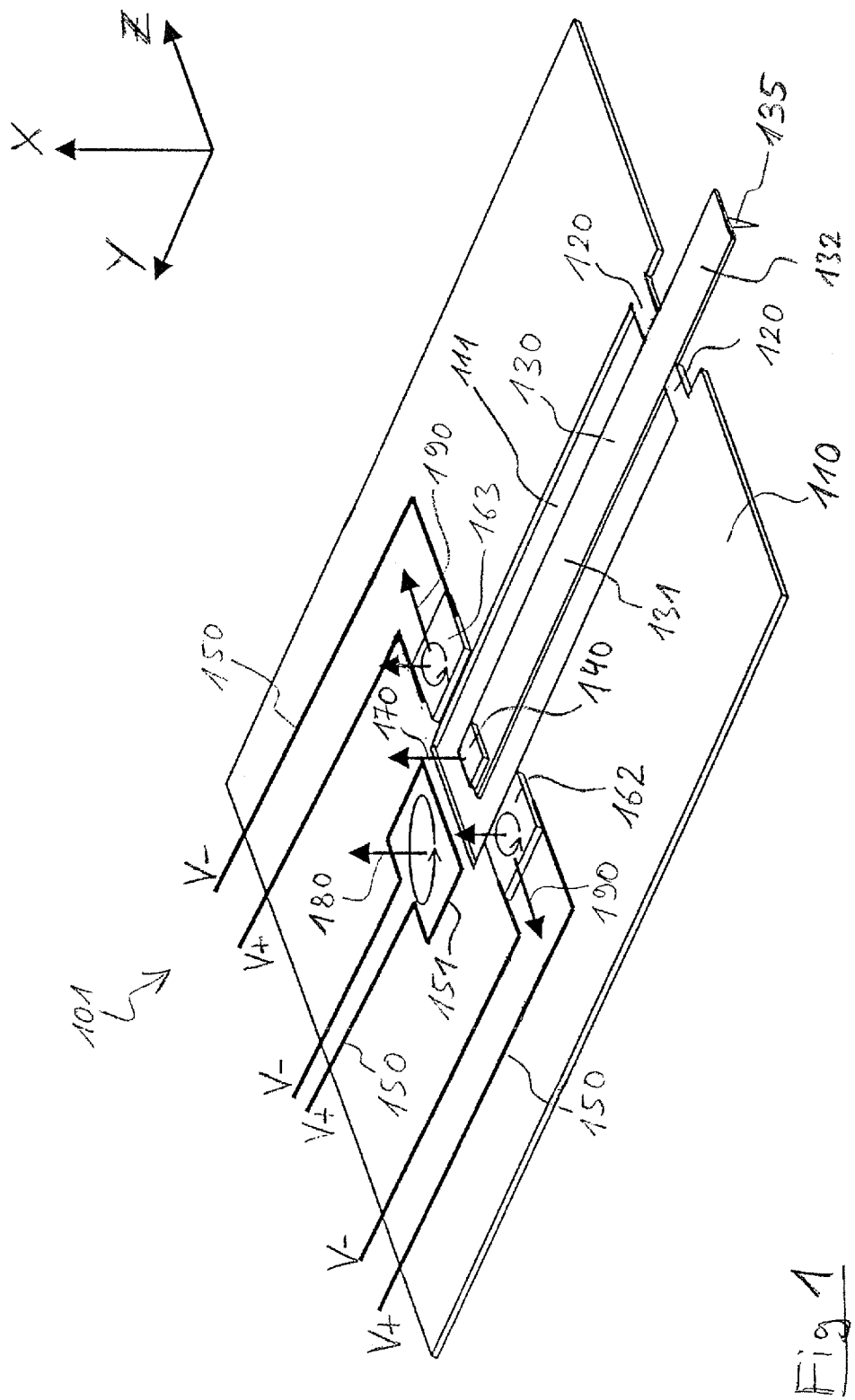
FIGS. 1 to 9 show schematic perspective views of different probe devices including a cantilever according to the present invention.

According to an embodiment of the present invention, a device includes a first part and a second part, one of which is a cantilever, the first and second parts being connected to each other and being movable relative to each other. The device further includes a magnetic element arranged on the first part and configured to provide a magnetic field. The device further includes a magnetization device arranged on the second part and configured to provide an actuation magnetic field which interacts with the magnetic field of the magnetic element, thereby causing or suppressing a relative movement of the first and second part.

This configuration of the device may allow a "localized" actuation of the cantilever. The magnetic element and the magnetization device may be constructed in such a way that the influence of the respective magnetic fields is restricted to a relatively small and local area of the device. Moreover, the actuation mechanism may be realized independently from the type (functionality) of device. Apart from effecting a relative movement of the first and second part, the magnetic element and the magnetization device may be employed in order to suppress or damp (undesired) movements of the first and second part, as well.

According to a preferred embodiment, one of the first and second part of the device is the cantilever, and the other one of the first and second part is a section of a substrate. The substrate section includes an opening extending to a side area of the substrate section. A portion of the cantilever is arranged inside the opening of the substrate section. In this embodiment, the substrate section may (partially) enclose the cantilever, thereby allowing for a space-saving geometry. A configuration like this may furthermore promote the integration of a number of magnetization devices.

According to another preferred embodiment, the device includes two bars arranged at opposite side edges of the cantilever, the two bars connecting the cantilever and the substrate section to each other. In this connection, it is furthermore preferred that the cantilever includes two sections having different lengths with respect to the two bars. Such a configuration may provide an improved mechanical gain with respect to a movement of the cantilever.

According to another preferred embodiment, the first part of the device is the cantilever, wherein the cantilever includes a probe tip, and wherein the magnetic element and the probe tip are arranged at opposite ends of the cantilever. In this embodiment, the influence of the magnetic fields of the magnetic element and of the magnetization device in the area of the tip end of the cantilever may be (largely) suppressed. As a consequence, the tip end of the cantilever or the probe tip, respectively, may (additionally) be designed with respect to special-purpose applications, including e.g. an electrical, magnetic, thermal, chemical etc. characterization of materials.

According to another preferred embodiment, the magnetization device includes a conductor path having the form of a loop. Such a magnetization device may be produced in a miniaturized form and in an easy and uncomplicated manner.

According to another preferred embodiment, the device furthermore includes a magnetic sensor being arranged on the second part. The magnetic sensor is configured to detect a magnetic field of the magnetic element and a change of the same when moving the first and second part relative to each other. Comparable to the actuation mechanism, a configuration like this makes possible a "localized" sensing of a deflection or movement of the cantilever. Here, the same magnetic element is used with respect to actuation (together with the magnetization device) as well as with respect to sensing the deflection (together with the magnetic sensor) of the cantilever. The deflection sensing mechanism may also be realized independently form the type (functionality) of device. It is furthermore possible to realize the deflection sensing mechanism and the actuation mechanism in such a way that an interference between deflection sensing and actuation may be reliably avoided.

According to another preferred embodiment, the magnetic sensor is a magneto-resistive sensor. A magneto-resistive sensor may allow for sensing the deflection of the cantilever with a high resolution.

According to another preferred embodiment, the magnetic sensor is configured to detect a magnetic field in a sensing direction which is perpendicular with respect to a direction of the actuation magnetic field provided by the magnetization device. As a consequence, an interference between the actuation and the deflection sensing mechanism may be (largely) suppressed.

According to another preferred embodiment, the magnetization device and the magnetic sensor are configured as a combined device. Such a configuration ("combined actuation and sensing") promotes a space-saving geometry of the device, as well.

According to another preferred embodiment, the device includes a number of magnetization devices for causing or suppressing a relative movement of the first and second part. In this embodiment, the magnetization devices may for example be arranged in such a way that causing (or suppressing) a torsion of the cantilever is made possible. A torsion motion of the cantilever may be e.g. advantageous with respect to low friction imaging.

Likewise, according to another preferred embodiment, the device includes a number of magnetic sensors. As a consequence, sensing the deflection of the cantilever may be carried out with a high sensitivity and resolution. Moreover, the magnetic sensors may be arranged in such a way that sensing a torsion motion of the cantilever is made possible.

According to another preferred embodiment, the device includes an array of cantilevers. Here, the "localized" actuation mechanism may be applied for each of the cantilevers, wherein a deflection of individual cantilevers may be caused (or suppressed) without influencing other cantilevers (or a deflection of the same) of the array.

Furthermore, according to the present invention, a scanning system includes a device according to one of the preceding described embodiments. As a consequence, the scanning system may provide a "localized" actuation mechanism for a cantilever. Such a configuration may promote the individual actuation of cantilevers arranged in a cantilever array.

The following perspective FIGS. 1 to 9 show probe devices or a portion of such probe devices, respectively, which may be applied in a scanning probe microscope system for analyzing the surface of a sample. The probe devices may be applied e.g. in the field of bio-sensors, data storage, metrology, nanofabrication, and/or material characterization. The probe devices are configured both for a localized actuation of a cantilever and for a localized sensing of a deflection of the same.

The integrated actuation and sensing scheme make possible a large scale parallelization, wherein a high-speed operation at each cantilever level and a high through-put may be provided. In particular, the sensing mechanism may provide a high bandwidth for high-speed applications and operation at resonant frequency. Likewise, the actuation mechanism may provide a high-speed capability at cantilever level for the above-mentioned applications.

Concerning a production of the depicted devices and structures, usual and low-cost methods and process steps which are known from semiconductor fabrication technologies or from the fabrication of micro-electro-mechanical-systems (MEMS) may be applied. These process steps may include well developed, inexpensive sputtering, deposition and lithography processes, making possible a fabrication of the devices in miniaturized form (small form-factor). For way of illustration, the perspective FIGS. 1 to 9 furthermore indicate spatial directions of a three-dimensional coordinate system (arrows along the x-, y- or z-axis), and possible orientations of magnetic fields or magnetizations, respectively.

FIG. 1 shows a schematic illustration of a probe device 101 (also referred to as "cantilever chip") or a portion thereof. The probe device 101 includes a section of a substrate 110 (e.g. a silicon substrate) serving as support body and a micro cantilever 130, which is connected to, and which is movable relative to, the substrate section 110. The cantilever 130 has a rectangular and strip-like form. At one end of the cantilever 130, the cantilever 130 includes a probe tip 135, shown as protruding downwardly in FIG. 1. A magnetic element 140 is arranged at the other end of the cantilever 130.

Substrate section 110 includes a rectangular opening 111 extending to an edge or a side area of the substrate section 110, wherein the cantilever 130 is substantially arranged inside the opening 111. Such a configuration allows for a space-saving geometry. Here, the cantilever 130 is connected to the substrate section 110 by means of two bars 120 arranged at opposite side edges (long side) of the cantilever 130. The cantilever 130 may be divided into two sections 131, 132 with respect to the two bars 120, wherein the cantilever sections 131, 132 act like arms of a lever. At this, the two bars 120 serve as hinge and define an axis of rotation or a reference axis concerning a converse deflection of the cantilever sections 131, 132 in the x-direction, which is referred to as "vertical deflection" in the following.

The two cantilever sections 131, 132 have different lengths with respect to the two bars 120. As a consequence, a mechanical gain is provided for the vertical displacement of the cantilever 130, because a deflection of the short cantilever section 132 corresponds to a bigger deflection of the long cantilever section 131. At this, the cantilever 130 and the two bars 120 may be designed in such a way that a vertical deflection at the tip end of the cantilever 130 corresponds linearly to a vertical deflection at the "magnetic" end of the cantilever 130. Furthermore, the mechanical gain may correspond to a factor in the range of, e.g., three.

As described above, the probe device 101 includes a magnetic element 140 arranged on the cantilever 130, i.e., at an end portion of the cantilever 130 which is opposite to the end of the cantilever 130 including the probe tip 135. The magnetic element 140 is configured to provide a magnetic field 170, which is used for both actuation and for sensing a deflection of the cantilever 130. In the state of the cantilever 130 shown in FIG. 1 (non-deflected position), the magnetic field 170 of the magnetic element 140 may e.g. be oriented in the x-direction.

The magnetic element 140 may be configured in different ways. As an example, the magnetic element 140 may be a permanent magnet which creates its own persistent magnetic field 170. Alternatively, the magnetic element 140 may include a magnetic material or layer, respectively, which may be magnetized by applying an external magnetic field. Here, the magnetic material may in particular be a ferromagnetic material.

The probe device 101 furthermore includes several conductor paths 150 being arranged on the substrate section 110. One of the conductor paths 150 includes a portion having the form of a (rectangular) loop 151, which is disposed at an edge portion of the opening 111 facing the front end of the cantilever section 131, thereby being arranged close to the magnetic element 140.

The loop 151, which may be produced with a miniaturized form and in an easy and uncomplicated manner, serves as a magnetization device in order to cause a vertical deflection of the cantilever 130. For this purpose, an electric current flow (bias current) is passed through the loop 151 (indicated by a circular arrow in FIG. 1), wherein the loop 151 acts as an electromagnet and produces an actuation magnetic field 180, which may e.g. be oriented in the x-direction. The loop 151 may additionally be provided with a soft magnetic core (not depicted) in order to improve the field strength of the actuation magnetic field 180.

Generation of a current flow is carried out by means of a power supply (not shown), which is configured to apply voltage potentials V+, V− to the conductor path 150 (with the loop 151), as indicated in FIG. 1. The actuation magnetic field 180 interacts with the magnetic field 170 of the magnetic element 140, thereby causing a vertical motion of the cantilever 130, i.e. a vertical displacement of the cantilever section 131, and thus of the cantilever section 132 including the probe tip 135. By modulating the applied current or voltage, respectively, an oscillation or vibration of the cantilever 130 in the x-direction may be induced, which is also referred to as "vertical mode". In the vertical mode, the cantilever 130 may e.g. be actuated to vibrate at or near its resonant frequency.

The localized micro-magnetic actuation scheme may offer a high bandwidth, which is not limited (by e.g. a mechanical or electrical resonance, concerning a piezo or electrostatic actuation, respectively). Moreover, the actuation mechanism may be realized independently from the probe type.

The probe device 101 furthermore includes two magnetic sensors 162, 163 in order to locally sense a displacement of the cantilever 130 with high bandwidth and high resolution. The two magnetic sensors 162, 163 are arranged at opposite edge portions of the opening 111 facing the side edges of the cantilever 130 in the area of the magnetic end, thereby being arranged close to the magnetic element 140. The magnetic sensors 162, 163 are connected to respective conductor paths 150 by means of which voltage potentials V+, V− from a power supply may be applied to the sensors 162, 163.

Each magnetic sensor 162, 163 is configured to detect the magnetic field 170 of the magnetic element 140 (or a corresponding magnetic flux) and a change of the same when moving the cantilever 130 (i.e. the cantilever section 131 and thus the magnetic element 140) relative to the substrate section 110. As indicated in FIG. 1, sensing the magnetic field 170 by means of the sensors 162, 163 is carried out in a sensing direction 190 which is e.g. oriented along the z-axis of the depicted coordinate system. Here, the sensing direction 190 is perpendicular with respect to the direction of the actuation magnetic field 180, whereby an interference between actuation and sensing of the position or deflection of the cantilever 130 may be prevented. Furthermore, it may be utilized that the actuation magnetic field 180 introduces a known signal in the magnetic sensors 162, 163, which may be compensated for.

Comparable to the actuation mechanism, the sensing scheme may be realized independently from the probe type, as well. Concerning the magnetic sensors 162, 163, the sensors 162, 163 may be configured in different ways. An example are magneto-resistive (MR) sensors, like e.g. AMR (anisotropic magneto-resistance), GMR (giant magneto-resistance) or TMR (tunneling magneto-resistance) sensors, by means of which magnetic fields or stray magnetic fields, respectively, may be measured. At this, a displacement of the cantilever 130 is detected by monitoring the respective resistances of the sensors 162, 163 or a change of the same, respectively. The application of magneto-resistive sensors 162, 163 allows for sensing the deflection of the cantilever 130 with a high bandwidth and high resolution. In particular, a bandwidth in excess of 1 MHz and a resolution at the sub-nanometer level may be provided.

Deflection sensing with a high sensitivity and resolution is further promoted due to the application of two magnetic sensors 162, 163 which are arranged at opposite sides with respect to the magnetic element 140. At this, respective measuring signals of the two sensors 162, 163 may e.g. be summed up, which is also referred to as "summing mode". The measuring signals may also be subtracted, which is also referred to as "differential mode", and which makes possible a detection of a torsion motion of the cantilever 130, i.e. a torsion of the cantilever 130 with respect to its longitudinal axis (y-direction in FIG. 1). Detection of such a torsion deflection of the cantilever 130 may provide additional information about a scanned surface and a higher bandwidth for the scan process.

For way of illustration, a surface analysis of a sample may be carried out in the following exemplary way. The probe tip 135 is brought into proximity of the sample surface and is scanned over the surface, wherein forces between the tip 135 and the sample lead to a vertical and/or torsional deflection of the cantilever 130. The vertical and/or torsional deflection of the cantilever 130 is detected by means of the two magnetic sensors 162, 163, thus generating an image of the sample surface. In a dynamic mode, the cantilever 130 is additionally actuated by means of the loop 151 to vibrate e.g. at or near its resonant frequency. Due to the localized sensing mechanism, deflection sensing may e.g. be carried out with a bandwidth in excess of 1 Mhz, and with a resolution of e.g. smaller than 0.2 nm.

Instead of carrying out the actuation and deflection sensing in a decoupled way by using the magnetic sensors 162, 163 only for sensing the displacement of the cantilever 130, the magnetic sensors 162, 163 may also (with or without the loop 151) be applied in order to provide an actuation magnetic field 180 for inducing a displacement of the cantilever 130 ("combined actuation and sensing"). As indicated in FIG. 1, the sensors 162, 163 and portions of the conductor paths 150 adjoining to the sensors 162, 163 may be designed to have a loop-like structure (e.g. the rectangular half-loop as shown in FIG. 1), wherein passing an electric current flow (bias current) through the conductor paths 150 and the sensors 162, 163 (indicated by a circular arrow in FIG. 1) results in providing an actuation magnetic field 180 interacting with the magnetic field 170 of the magnetic element 140, the actuation field 180 being oriented e.g. in the x-direction. By modulating the applied current or voltage, respectively, the cantilever 130 may again be actuated to vibrate in a vertical mode. At this, the two sensors 162, 163 may be applied both for actuation of the cantilever 130 and for deflection sensing.

Due to the fact that the two magnetic sensors 162, 163 are arranged at opposite sides with respect to the magnetic element 140, the sensors 162, 163 may also be operated in such a way that the cantilever 130 carries out an additional or exclusive torsion motion with respect to its longitudinal axis. An oscillating torsion motion of the cantilever 130, which is also referred to as "torsion mode", may be provoked by a respective modulation of the bias voltage applied to the sensors 162, 163. The torsion mode of the cantilever 130 may e.g. be employed for the purpose of ultra-low friction imaging, which is also referred to as dithering mode. Low friction may reduce a wear of the probe tip 135, which is e.g. advantageous for high-throughput operations at high scan speeds.

With respect to torsion deflection, the cantilever 130 and the two bars 120 may be configured in such a way that a torsion deflection at the tip end of the cantilever 130 corresponds linearly to a torsion deflection at the magnetic end of the cantilever 130. Furthermore, a ratio between the torsion deflection of the magnetic end and the torsion deflection of the tip end may e.g. correspond to a factor of approximately one, and may e.g. correspond to a factor bigger than one (mechanical gain) in a dynamic mode, for the case that the cantilever 130 is operated at a torsion resonant frequency.

Conversely to the above description, instead of causing a vertical and/or a torsional deflection of the cantilever 130 by means of the loop 151 and/or the magnetic sensors 162, 163, the loop 151 and/or the magnetic sensors 162, 163 may also be operated in such a way to suppress or damp an undesired bending, deflection or torsion of the cantilever 130. Such a mode of operation may e.g. improve a surface scan, if applicable.

In the following, further embodiments of probe devices are described which include a corresponding or similar configuration compared to the probe device 101 of FIG. 1. With respect to details concerning corresponding features, possible benefits, effects and modes of operation, reference is made to the above description.

Figure 2:
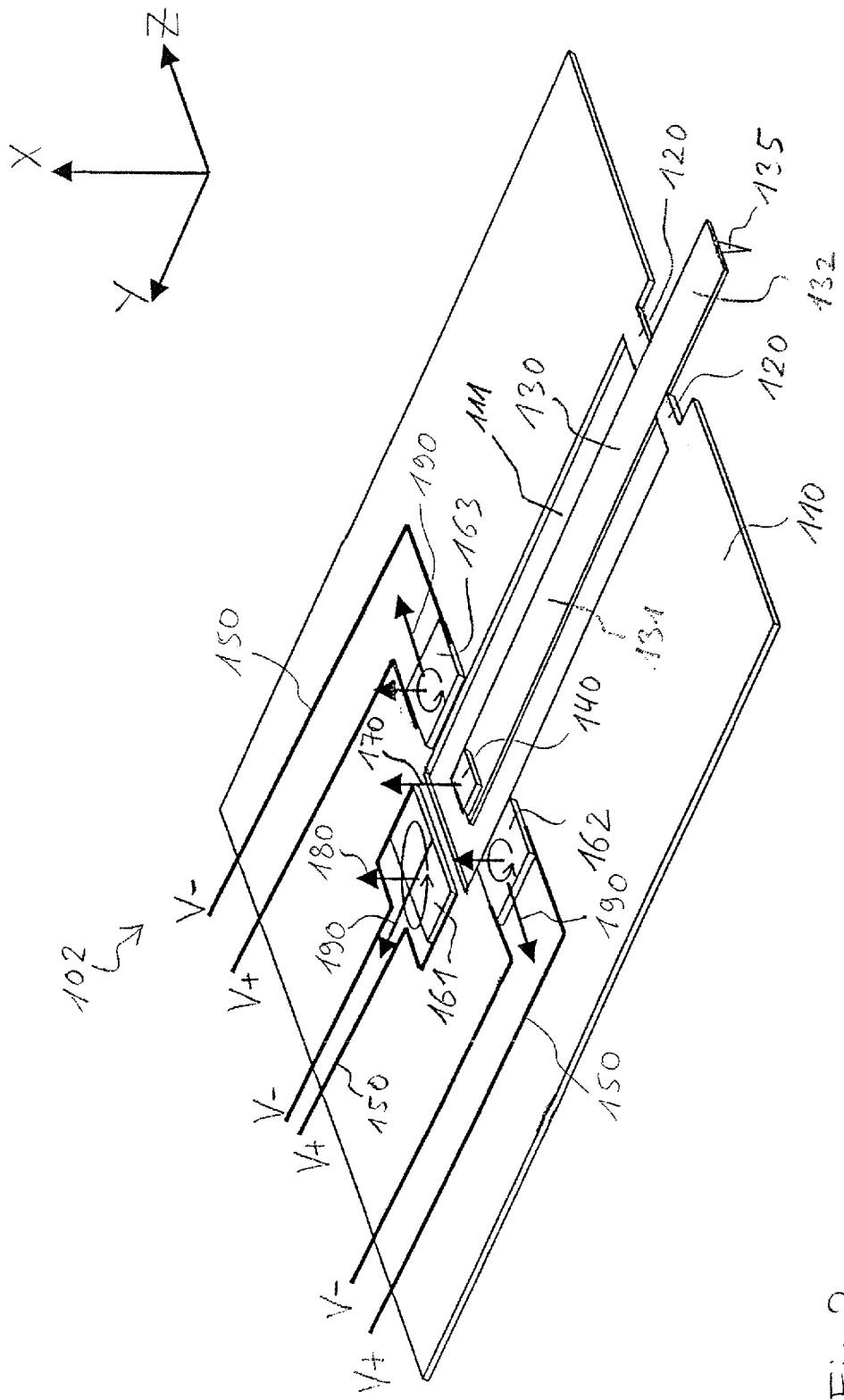

FIG. 2 shows a schematic illustration of another probe device 102, which substantially has the same configuration as the probe device 101 of FIG. 1. However, instead of the conductor loop 151, the probe device 102 includes a (further) magnetic sensor 161, which is disposed at an edge portion of the opening 111 facing the magnetic end of the cantilever 130, thereby being arranged close to the magnetic element 140. The magnetic sensor 161 may e.g. be a magneto-resistive sensor, as well.

As shown in FIG. 2, the magnetic sensor 161 may sense the magnetic field 170 of the magnetic element 140 in a sensing direction 190 which is (unlike the other sensors 162, 163) e.g. oriented along the y-axis of the depicted coordinate system. As a consequence, sensing the cantilever deflection may, if applicable, be carried out with a higher sensitivity. As further shown in FIG. 2, the magnetic sensor 161 is connected to conductor paths 150, wherein the magnetic sensor 161 and a portion of the conductor paths 150 in the area of the sensor 161 may have a loop-like structure.

The three magnetic sensors 161, 162, 163 of the probe device 102 may (individually or collectively) be used in order to generate an actuation magnetic field 180, thereby causing a vertical and/or a torsion deflection of the cantilever 130. With respect to deflection sensing, the magnetic sensors 161, 162, 163 may be used in order to detect a vertical displacement of the cantilever 130 (individually or in summing mode). Furthermore, the two sensors 162, 163 being arranged at opposite sides with respect to the magnetic element 140 may be used to detect a torsion deflection of the cantilever 130 (in differential mode).

Figure 3:
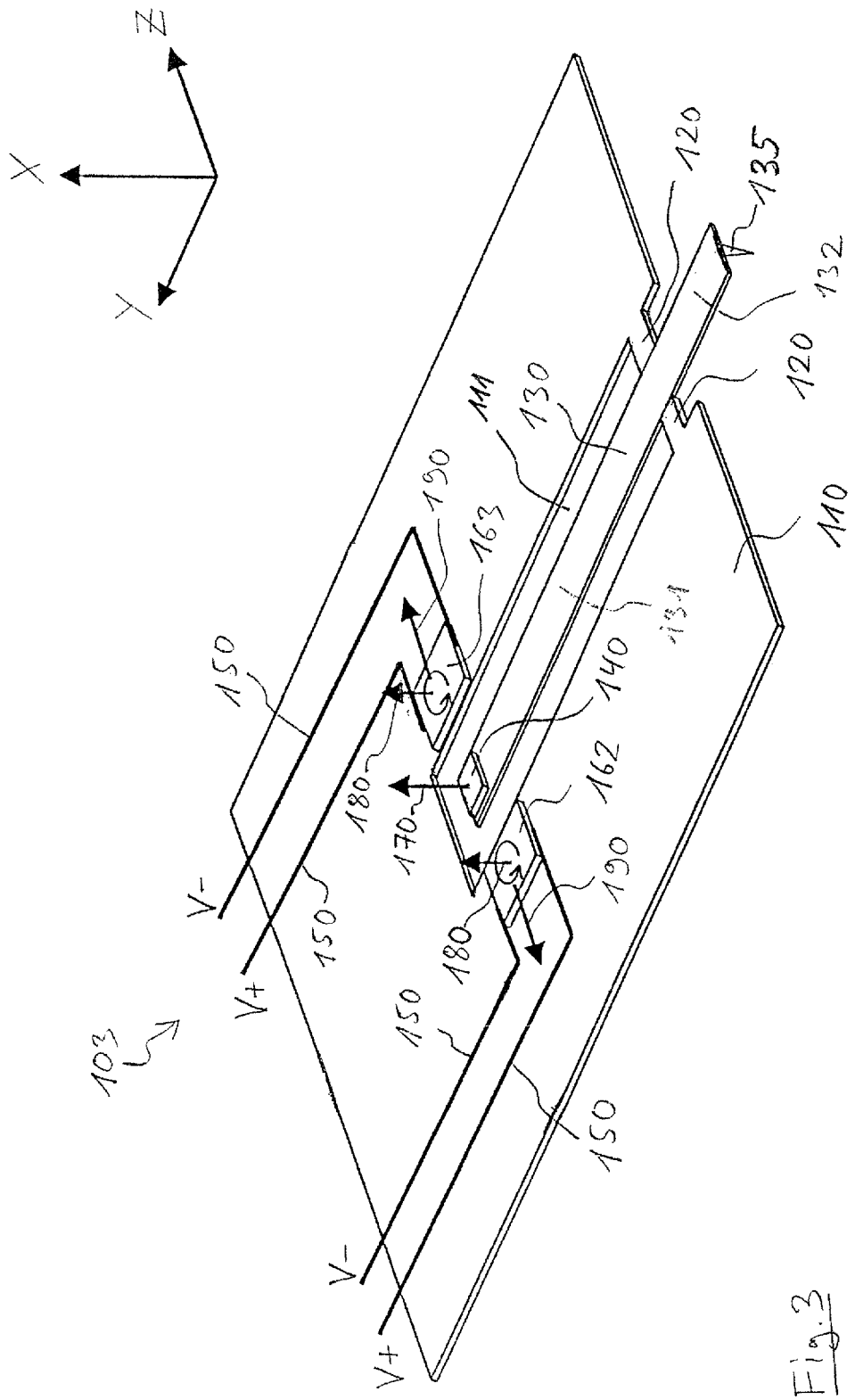

FIG. 3 shows a schematic illustration of a further probe device 103. Compared to the probe device 102 of FIG. 2, the probe device 103 (only) includes the two magnetic sensors 162, 163. The magnetic sensors 162, 163 are (again) arranged at opposite edge portions of the opening 111 of the substrate section 110 facing side edges of the cantilever 130 in the area of the magnetic end of the cantilever 130. By means of the two magnetic sensors 162, 163, a vertical and/or a torsion deflection of the cantilever 130 may be excited. The sensors 162, 163 may also be used in order to detect a vertical and/or a torsion deflection of the cantilever 130.

Figure 4:
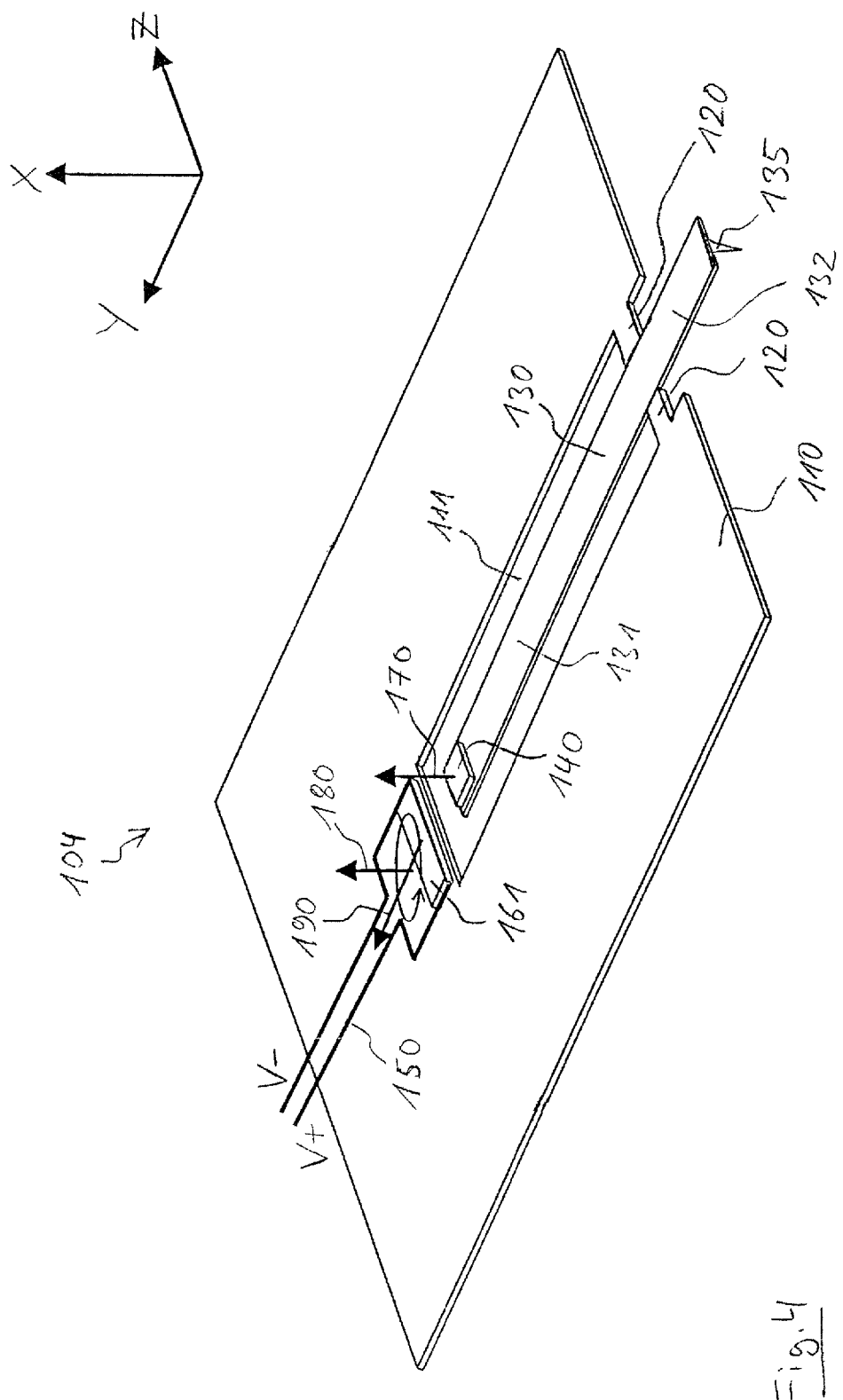

FIG. 4 depicts a schematic illustration of another probe device 104. Compared to the probe device 102 of FIG. 2, the two magnetic sensors 162, 163 are omitted, so that the probe device 104 only includes the magnetic sensor 161 facing the magnetic end of the cantilever 130. By means of the magnetic sensor 161, a vertical deflection of the cantilever 130 may be caused and detected, respectively.

According to the probe devices 101 to 104 of FIGS. 1 to 4, the magnetic element 140 and the probe tip 135 are arranged at opposite ends of the cantilever 130. In this way, the influence of the magnetic fields 170, 180 of the magnetic element 140 and of the magnetization devices 151, 161, 162, 163 in the area of the tip end of the cantilever 130 may be (largely) suppressed. As a consequence, it is possible to specify the type of probe device independently from the actuation mechanism and the deflection sensing mechanism. The probe devices may therefore include an additional structure or configuration in the area of the probe tip 135 allowing for special-purpose characterization, e.g. electrical, magnetic, thermal, chemical etc. characterization of materials.

Figure 5:
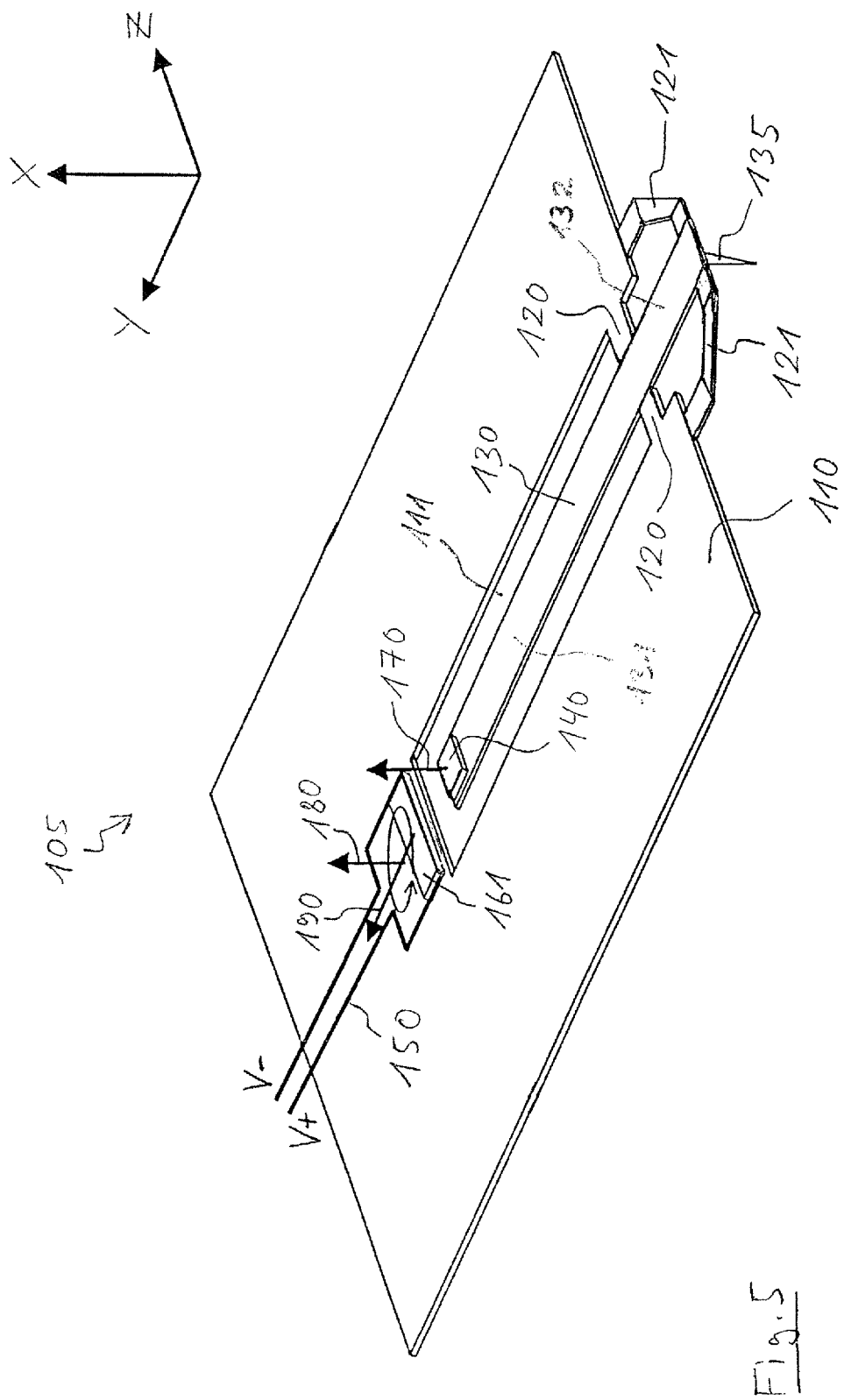

For way of illustration, FIG. 5 shows a schematic illustration of a probe device 105, which is a variant of the probe device 104 of FIG. 4. Unlike the probe device 104, the probe device 105 includes additional legs 121 being arranged at the side edges of the cantilever 130 in the area of the tip end of the same, and connecting the tip end of the cantilever 130 to a lateral edge of the substrate section 110. By means of the side legs 121, which are configured to furthermore allow for a deflection of the cantilever 130 (i.e. the cantilever section 132), an additional stabilization of the cantilever 130 may be provided.

Moreover, the legs 121 may serve for one of the above described special-purpose functionality of the probe device 105. As an example, the legs 121 may include a doped (silicon) material, which may be used with respect to a thermal characterization of a sample. The legs 121 may also be used in order to e.g. provide or carry (additional) conductor paths, which are connected to an additional device arranged on the cantilever 130 in the area of the tip end, the additional device being configured for a special-purpose characterization (not depicted). Such side legs 121 (or other similar structures) may also provided with respect to the probe devices 101 to 103 of FIGS. 1 to 3.

Figure 6:
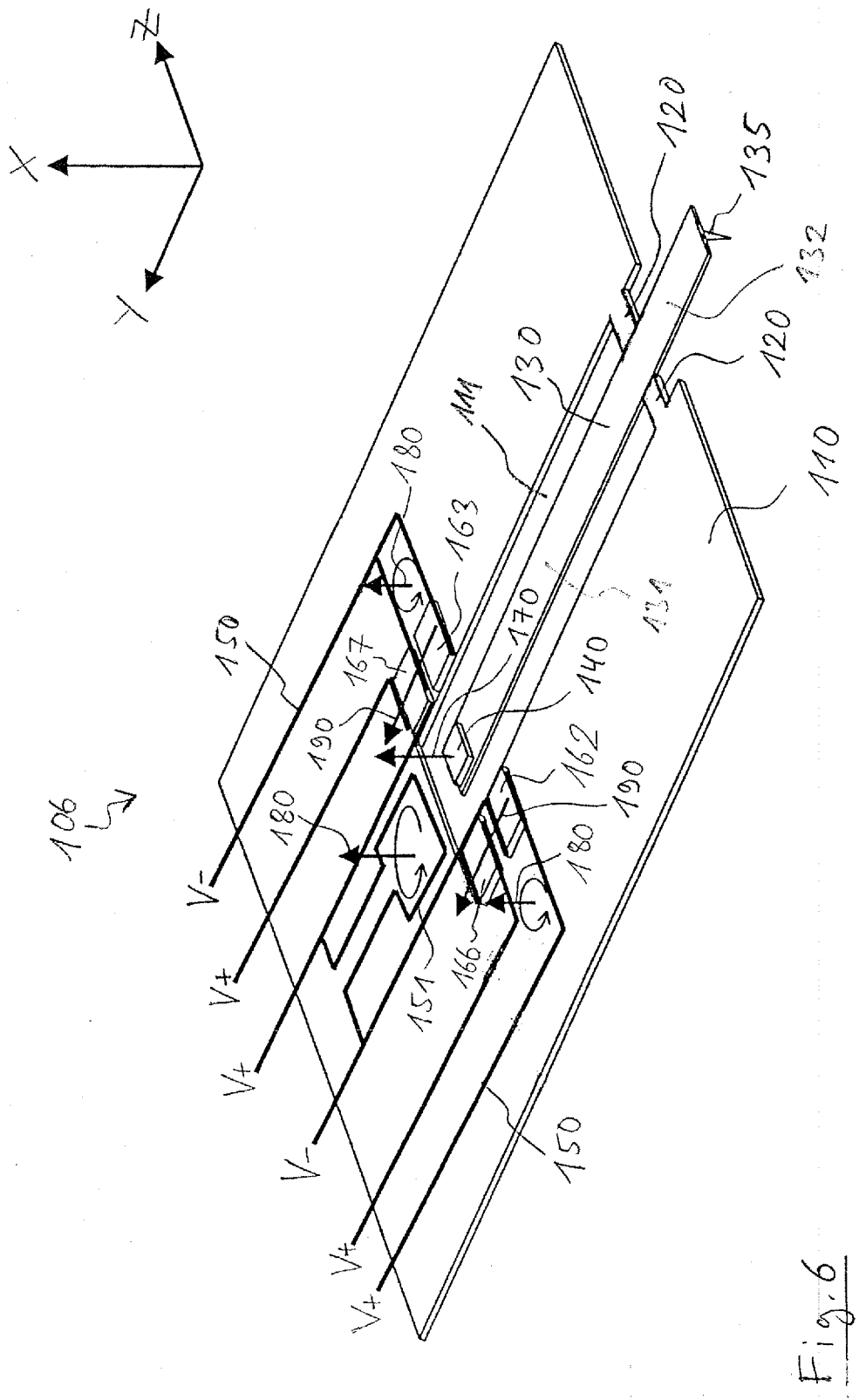

FIG. 6 shows a schematic illustration of a probe device 106, which represents another modification of the probe device 101 of FIG. 1. Instead of only two magnetic sensors 162, 163, the probe device 106 includes pairs of magnetic sensors 162, 166 and 163, 167. The sensor pair 162, 166 and the sensor pair 163, 167 are arranged at opposite edge portions of the opening 111 of the substrate section 110 facing side edges of the cantilever 130 in the area of the magnetic end of the cantilever 130. At this, the sensor pairs 162, 166 and 163, 167 may be arranged symmetrically with respect to an (imaginary) axis (not depicted) oriented in the z-direction and passing through a centre of the magnetic element 140. The sensors 162, 163, 166, 167 may again be configured as magneto-resistive sensors. The probe device 106 furthermore includes a conductor loop 151 and respective conductor paths 150 being connected to the loop 151 and the sensors 162, 163, 166, 167, by means of which respective voltage potentials V+, V− may be applied to the same.

Providing an actuation magnetic field 180 for actuation of the cantilever 130 may be carried out only with the aid of the loop 151 (vertical deflection). Alternatively, the sensor pairs 162, 166 and 163, 167 may also be used in order to induce a (vertical and/or torsion) deflection of the cantilever 130.

Concerning deflection sensing, the sensor pairs 162, 166 and 163, 167 may provide a high sensitivity and resolution for both vertical and torsion measurements. Here, sensors arranged at opposite sides with respect to the magnetic element 140, i.e. the sensors 162, 163 and the sensors 166, 167 may detect a vertical and/or a torsion deflection of the cantilever 130 in summing and differential modes, respectively, comparably to the probe device 101 of FIG. 1. Furthermore, the sensors 162, 166 and the sensors 163, 167 may detect a vertical and/or a torsion deflection of the cantilever 130 in differential and summing modes, respectively. As indicated in FIG. 6, each of the sensors 162, 163, 166, 167 may detect the magnetic field 170 of the magnetic element 140 in the same sensing direction 190, which is e.g. oriented along the y-axis of the depicted coordinate system.

Figure 7:
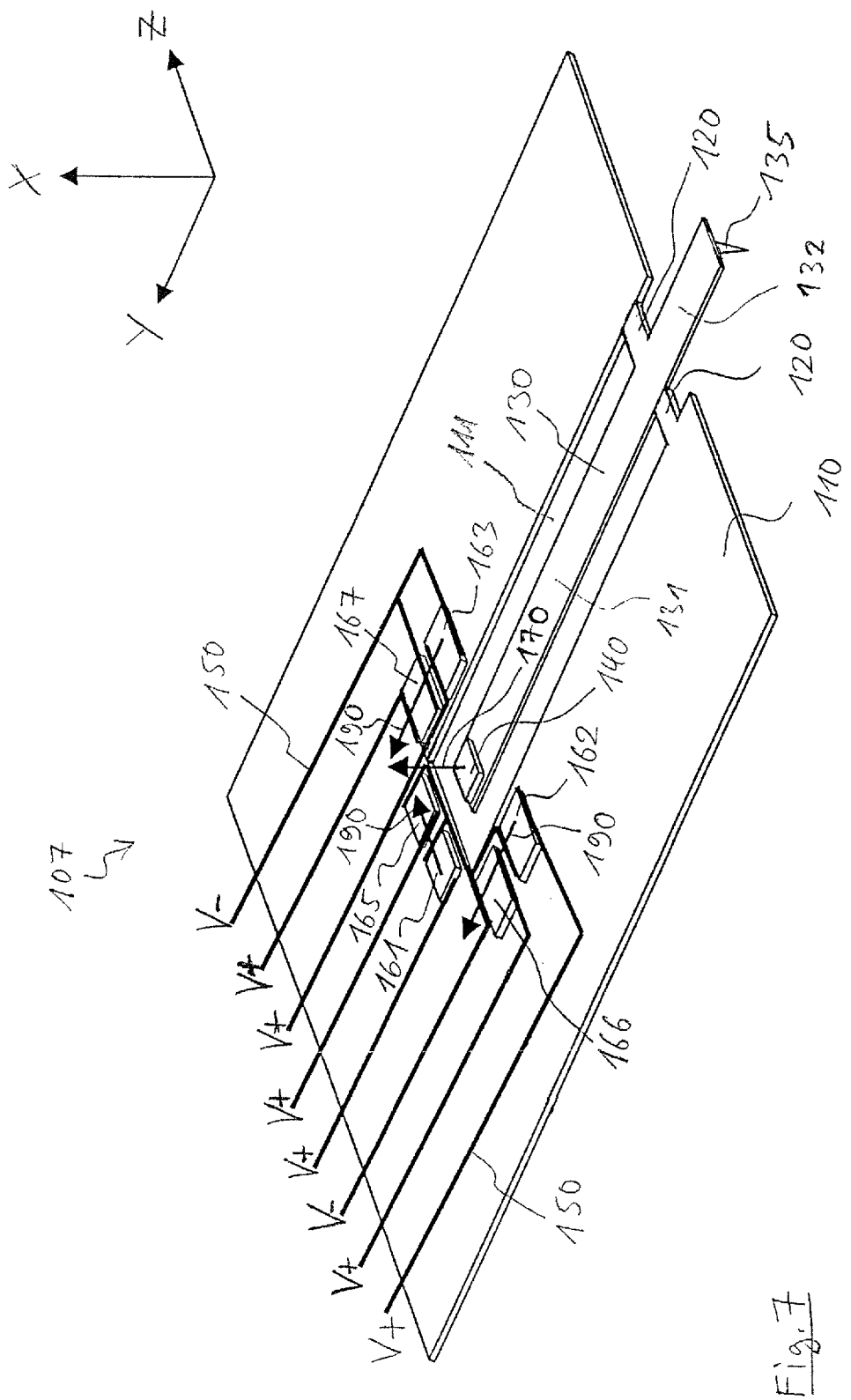

FIG. 7 shows a schematic illustration of another probe device 107, which substantially has the same configuration as the probe device 106 of FIG. 6. However, instead of the conductor loop 151, the probe device 107 includes a (further) pair of magnetic sensors 161, 165, which is disposed at an edge portion of the opening 111 facing the magnetic end of the cantilever 130. The magnetic sensors 161, 165 may e.g. be magneto-resistive sensors, as well.

As shown in FIG. 7, the magnetic sensors 161, 165 may sense the magnetic field 170 of the magnetic element 140 in a sensing direction 190 which is (unlike the other sensors 162, 163, 166, 167) e.g. oriented along the z-axis of the depicted coordinate system. As a consequence, sensing the cantilever deflection may, if applicable, be carried out with a higher sensitivity.

The sensors 161, 162, 163, 165, 166, 167 may (individually or collectively) be used in order to perform a (vertical and/or torsion) deflection of the cantilever 130, and to sense a (vertical and/or torsion) deflection of the cantilever 130 with high sensitivity and resolution. As an example, sensors arranged at opposite sides with respect to the magnetic element 140, i.e. the sensors 161, 162, 163 and/or 165, 166, 167 may detect a vertical and/or a torsion deflection of the cantilever 130 in summing and differential modes, respectively. Furthermore, the sensors 161, 165, the sensors 162, 166, and the sensors 163, 167 may detect a vertical and/or a torsion deflection of the cantilever 130 in differential and summing modes, respectively.

Figure 8:
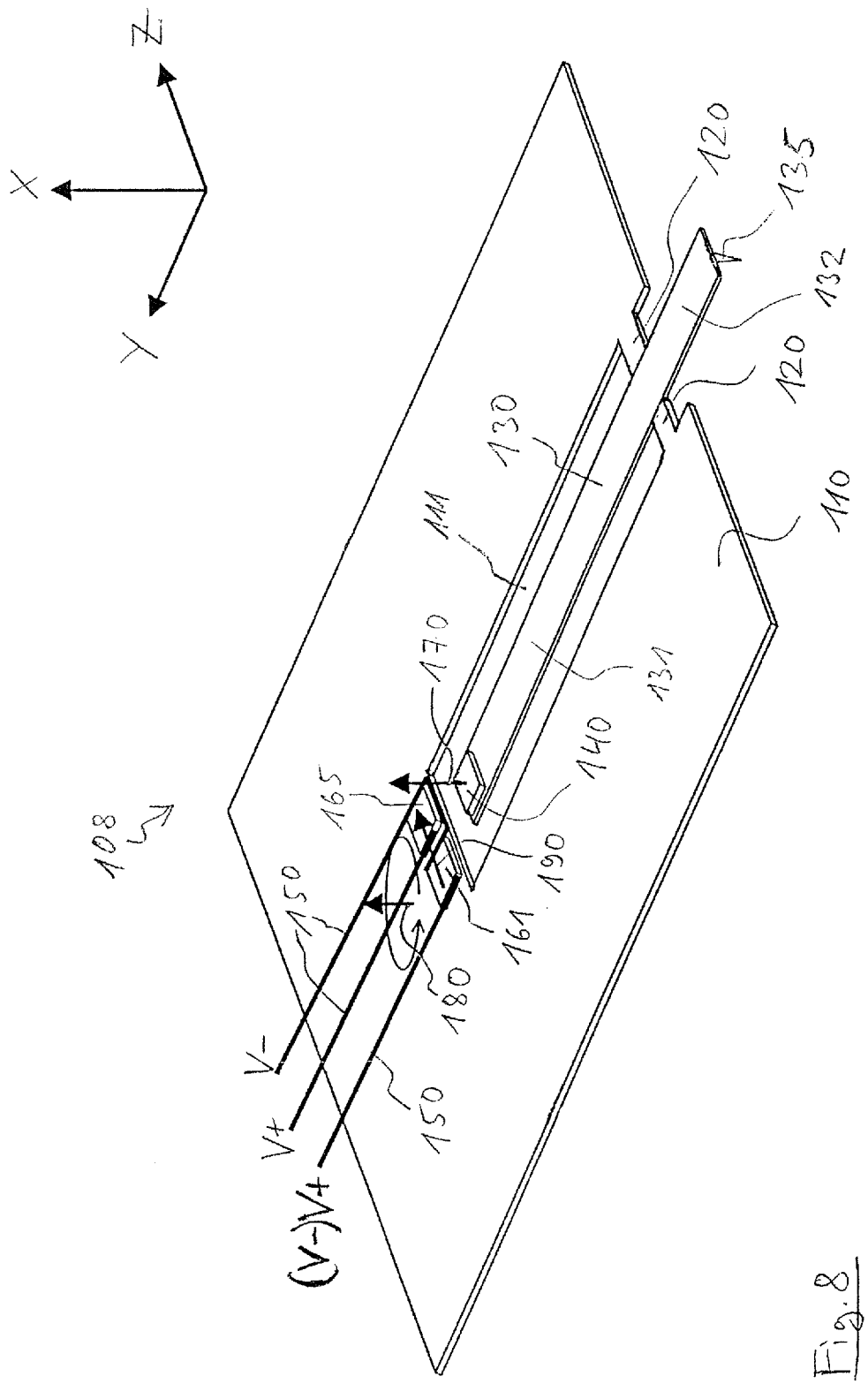

FIG. 8 shows a schematic illustration of another probe device 108. Compared to the probe device 107 of FIG. 7, the two sensor pairs 162, 166 and 163, 167 are omitted, so that the probe device 108 only includes the magnetic sensor pair 161, 165 facing the magnetic end of the cantilever 130. By means of the magnetic sensor pair 161, 165, a vertical and/or torsion deflection of the cantilever 130 may be caused and detected, respectively. Here, the sensors 161 and 165 may detect a vertical and a torsion deflection of the cantilever 130 in differential and summing modes, respectively. Torsion deflection may be caused by reversing the polarity of the applied voltage signal (indicated in FIG. 8 by means of potential V− set in parentheses).

Figure 9:
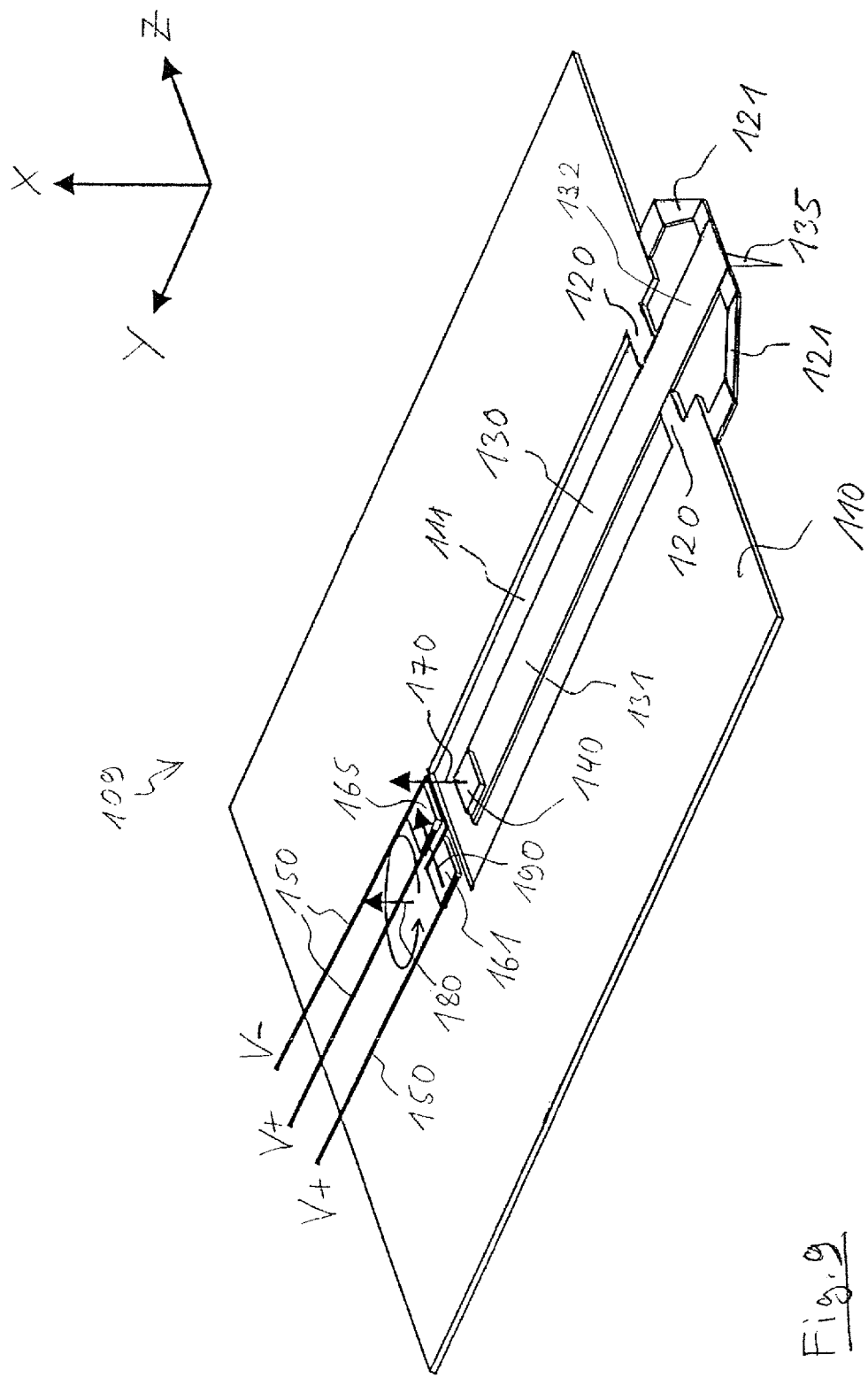

Concerning the probe devices 106, 107, 108 of FIGS. 6, 7, 8, it is possible to include an additional structure or configuration in the area of the probe tip 135 allowing for special-purpose characterization, e.g. electrical, magnetic, thermal, chemical etc. characterization of materials, as well. For way of illustration, FIG. 9 shows a schematic illustration of a probe device 109, which is a variant of the probe device 108 of FIG. 8. Unlike the probe device 108, the probe device 109 includes additional legs 121 being arranged at the side edges of the cantilever 130 in the area of the tip end of the same, and connecting the tip end of the cantilever 130 to an edge of the substrate section 110.

By means of the side legs 121, which are configured to furthermore allow for a deflection of the cantilever 130, a special-purpose functionality of the probe device 109 may be provided. As an example, the legs 121 may include a doped (silicon) material, which may be used with respect to a thermal characterization of a sample. The legs 121 may also be used in order to e.g. provide or carry (additional) conductor paths, which are connected to an additional device arranged on the cantilever 130 in the area of the tip end, the additional device being configured for a special-purpose characterization (not depicted). Moreover, the legs 121 may provide an additional stabilization of the cantilever 130. Such side legs 121 (or other similar structures) may also provided with respect to the probe devices 106 and 107 of FIGS. 6 and 7.

FIG. 10 shows a schematic illustration of a scanning system 200. The scanning system 200, which may be a scanning probe microscope, includes a probe device 210, a power supply (voltage or current source) 220, and a control device 230.

The probe device 210, which includes an array of micro cantilevers 130 each having a probe tip, may be configured according to one of the probe devices 101 to 109 of FIGS. 1 to 9. Here, the localized actuation mechanism makes it possible to individually cause (or suppress) a (vertical and/or torsion) deflection of a cantilever 130 independently from other cantilevers 130 of the array, i.e. without influencing other cantilevers 130. The same advantage applies to the localized (vertical and/or torsion) deflection sensing mechanism. Providing an array of cantilevers 130 allows for carrying out surface characterizations with high throughput.

Instead of the depicted five cantilevers 130, the probe device 210 may include a different number of cantilevers 130, e.g. in the range of thousand cantilevers 130. Also, the depicted probe device 210 indicates a one-dimensional array of cantilevers 130. Apart from such an array, the probe device 210 may also include a two-dimensional array of cantilevers 130, wherein cantilevers 130 are arranged in the form of e.g. rows and columns.

The control device 230 is used to control and evaluate a scan process carried out by means of the probe device 210, in which process the probe device 210 is scanned over a surface of a sample (not depicted). By means of the power supply 220, respective voltages or currents may be applied to the probe device 210, i.e. to respective magnetization devices and magnetic sensors used in the scan process.

The embodiments described in conjunction with the drawings are examples. Moreover, further embodiments may be realized which include further modifications. As an example, instead of a single loop 151, an electromagnet serving as magnetization device may be provided with a different structure (e.g. in the form of a solenoid). Concerning a magnetic element 140 being arranged on a cantilever 130, such a magnetic element 140 may also be configured in the form of an electromagnet. In a configuration like this, respective conductor paths being connected to the electromagnet may e.g. be arranged on bars 120.

Moreover, instead of arranging a magnetic element on a cantilever, and arranging magnetization devices for providing an actuation magnetic field and magnetic sensors for deflection sensing on a support body or substrate section, respectively, a converse configuration may be realized, as well. As an example, a device could be realized having a permanent magnet arranged on a substrate section and having a magneto-resistive sensor arranged on a cantilever at an end of the cantilever, the magneto-resistive sensor serving both for actuation and sensing a deflection of the cantilever.

Moreover, the depicted devices may include other components in addition to the depicted and described components. These additional components may e.g. include a reference magnetic or magneto-resistive sensor ("dummy sensor" which is isolated from the magnetic fields and which may be used to eliminate temperature drift effects of the sensors), flux concentrators, and a magnetic shielding (for the purpose of further prohibiting an interference of magnetic fields, to reduce noise effects, etc.).

Furthermore, it is pointed out that the localized magnetic actuation scheme and the localized magnetic deflection sensing scheme may be fabricated on any kind of device or probe (fabricated for electrical, magnetic, mechanical, thermal, chemical etc. characterization of materials). An example is a probe device having tip-less cantilevers, which may for example be used with respect to bio-sensing applications. The described concepts are not restricted to the depicted devices, but may be incorporated with respect to any other probe type and any other cantilever or microstructure device.

It is also possible to combine the described mechanisms with other (known) actuation and/or sensing mechanisms, e.g. an additional electrostatic actuation scheme, an additional optical sensing mechanism, etc. Additionally, actuation of a cantilever deflection may also be excited by applying an external magnetic field. In this case, the sensors may be shielded, and the external magnetic field may be properly oriented in order to suppress or minimize an undesired interference.

Those skilled in the art will recognize that the above changes in form and details made be made without departing from the spirit and scope of the present invention as defined in the following claims.

What is claimed is:

1. A device, comprising:
a first part and a second part, the first and second part being connected to each other and being movable relative to each other, wherein the first part is a cantilever comprising a rectangular strip having a probe tip at one end and a magnetic element, at an end opposite the probe tip, configured to provide a magnetic field, said first part being connected to the second part by a hinge;
and a magnetization device arranged on the second part and configured to provide an actuation magnetic field which interacts with the magnetic field of the magnetic element, thereby causing or suppressing relative movement between the first and second parts.

2. The device according to claim 1, wherein:
one of the first and second parts is the cantilever and the other of the first and second parts is a section of a substrate;
and the substrate section comprises an opening extending to a side area of the substrate section and a portion of the cantilever is arranged inside the opening of the substrate section.

3. The device according to claim 2, further comprising:
two bars arranged at opposite side edges of the cantilever, the two bars connecting the cantilever and the substrate section to each other.

4. The device according to claim 3, wherein:
the cantilever comprises two sections having different lengths with respect to the two bars.

5. The device according to claim 3, wherein:
the first part is the cantilever; the cantilever comprises a probe tip;

and the magnetic element and the probe tip are arranged at opposite ends of the cantilever.

6. The device according to claim 5, wherein the magnetization device comprises a conductor path having the form of a loop.

7. The device according to claim 6, further comprising: a magnetic sensor arranged on the second part, the magnetic sensor being configured to detect a magnetic field of the magnetic element and a change of the same when moving the first and second parts relative to each other.

8. The device according to claim 7, wherein the magnetic sensor is a magneto-resistive sensor.

9. The device according to claim 7, wherein the magnetic sensor is configured to detect a magnetic field in a sensing direction which is perpendicular with respect to a direction of the actuation magnetic field provided by the magnetization device.

10. The device according to claim 9, wherein the magnetization device and the magnetic sensor are configured as a combined device.

11. The device according to claim 10, further comprising: a plurality of magnetization devices for causing or suppressing a relative movement of the first and second part.

12. The device according to claim 11, further comprising a plurality of magnetic sensors.

13. The device according to any claim 12, further comprising an array of cantilevers.

14. A scanning system, comprising a device according to claim 1.

* * * * *